United States Patent [19]

Grant

[11] Patent Number: 5,003,417

[45] Date of Patent: Mar. 26, 1991

[54] SPRING DAMPENER ASSEMBLY FOR A SPROCKET DRIVEN BELT DRIVE SYSTEM

[75] Inventor: Frederic F. Grant, Bellflower, Calif.

[73] Assignee: Datatape Incorporated, Pasedena, Calif.

[21] Appl. No.: 285,835

[22] Filed: Dec. 16, 1988

[51] Int. Cl.⁵ .................. G11B 5/008; G11B 15/68
[52] U.S. Cl. ....................................... 360/93; 360/92; 414/280; 414/282
[58] Field of Search ............... 360/69, 71, 92, 93; 369/34, 35; 414/280, 282

[56] References Cited

U.S. PATENT DOCUMENTS

| | | | |
|---|---|---|---|
| 3,557,977 | 1/1971 | Atwater | 214/16.4 |
| 3,938,190 | 2/1976 | Semmlow et al. | 360/72 |
| 4,113,119 | 9/1978 | Brown et al. | 214/16.4 A |
| 4,198,871 | 4/1980 | Dunn et al. | 74/37 |
| 4,476,508 | 10/1984 | Tronjano et al. | 360/106 |
| 4,507,044 | 3/1985 | Hutchins et al. | 414/744 R |
| 4,566,346 | 1/1986 | Petiteau | 74/89.22 |
| 4,614,474 | 9/1986 | Sudo | 414/281 |
| 4,824,311 | 4/1989 | Mims | 414/280 X |

FOREIGN PATENT DOCUMENTS 0242144 10/1987 European Pat. Off. ............ 360/92

Primary Examiner—Robert S. Tupper
Assistant Examiner—Andrew L. Sniezek
Attorney, Agent, or Firm—William F. Noval

[57] ABSTRACT

A magnetic tape cassette transport/accessor assembly is actuated by a sprocket driven, belt drive system. First and second belt drives drive the transport/accessor assembly in horizontal and vertical directions and are tensioned by spring dampener assemblies. Each spring dampener assembly dampens rough and jerky movements and effects smooth and gentle acceleration and deceleration of the transport/accessor assembly. Each spring dampener assembly also provides compensation for belt drive wear, belt stretching and differential thermal expansion and contraction of the belt.

6 Claims, 8 Drawing Sheets

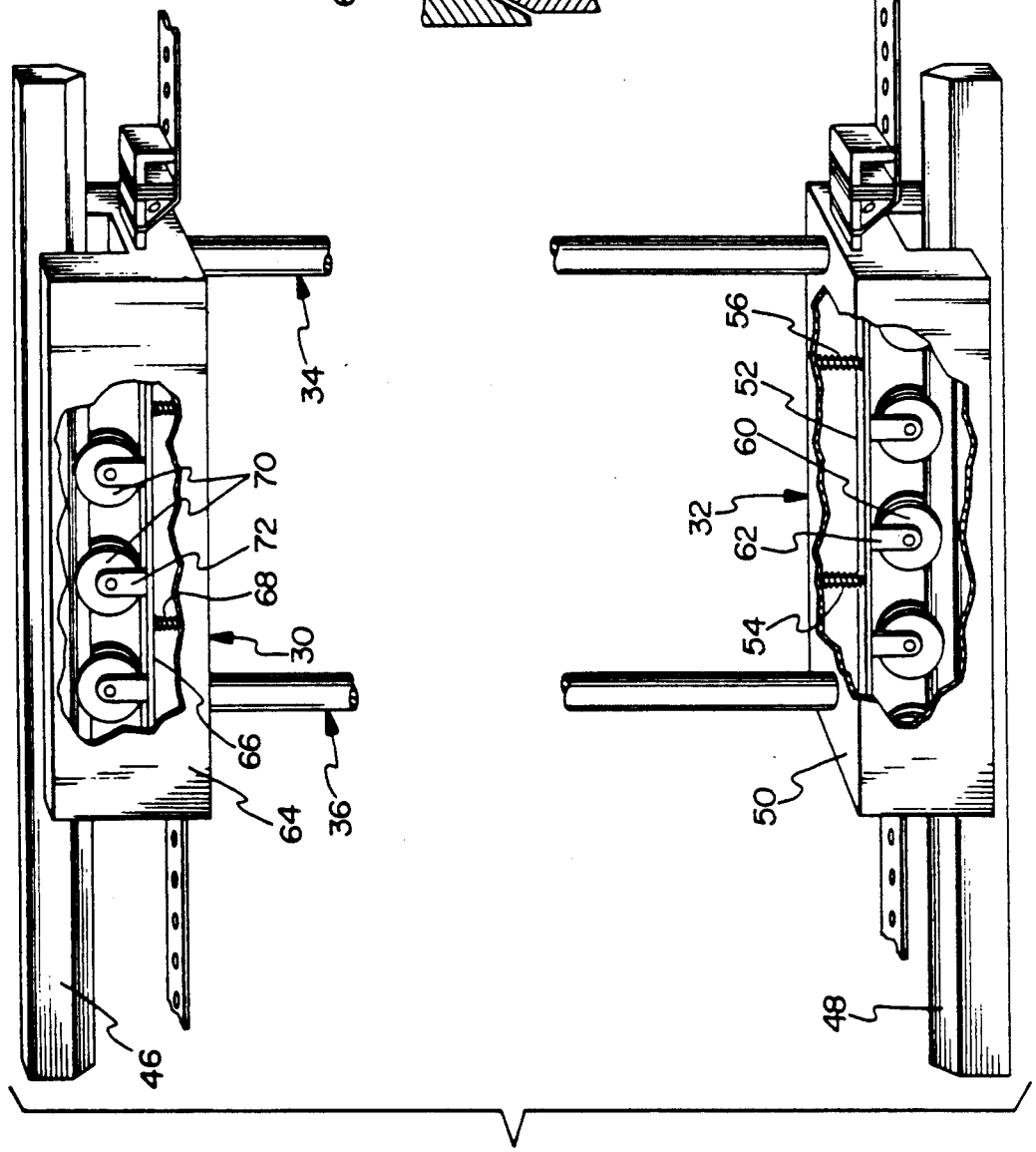

SPRING DAMPENER ASSEMBLY FOR A SPROCKET DRIVEN BELT DRIVE SYSTEM

BACKGROUND OF THE INVENTION

This invention relates in general to magnetic tape cassette transport apparatus. More particularly, this invention relates to a magnetic tape cassette transport/accessor assembly, which is driven in at least horizontal and vertical directions by means of a sprocket driven, belt drive system. The belt drive is tensioned by a spring dampener assembly which dampens rough and jerky movements of the assembly and effects smooth and gentle acceleration and deceleration thereof.

In applications in which a large amount of information is stored on electronic media (such as the storage of digital information on a plurality of magnetic tape cassettes), it is often desirable that each unit of storage (e.g., magnetic tape cassette), be accessed in a minimum amount of time. For example, it is desirable to minimize the time required to change over from one cassette to another cassette used in a magnetic tape record/reproduce device. Where the cassette storage system includes a large number of cassette storage compartments, it is also desirable that the cassette be transported between a storage compartment and a record/reproduce device, in a manner which minimizes damage to the cassette through rough or jerky movements in the cassette transport device. Thus, a smooth, gentle acceleration and deceleration of the cassette transport assembly is desired.

Various arrangements have been proposed to actuate a transport assembly to transport an object between spaced locations in a storage system. The simplest type of arrangement uses manual power for actuation of the transport system. (See: U.S. Pat. No. 4,113,119, issued Sept. 12, 1978, entitled APPARATUS FOR LOADING ARTICLES ONTO VERTICALLY SPACED HORIZONTALLY DISPOSED SHELVES.) Although such an arrangement is relatively inexpensive, it is disadvantageous because it is not readily adaptable for use as an automatic storage system. Moreover, manually initiated movements tend to be abrupt and jerky, causing possible damage to objects being transported. It has been proposed to use motors in order to actuate the transport assembly. Typically, at least one or more of the actuating motors are mounted on the transport assembly itself. (See, for example, U.S. Pat. No. 3,557,977, issued Jan. 26, 1971, entitled LOAD DETECTING DEVICE FOR WAREHOUSING SYSTEM, and U.S. Pat. No. 4,614,474, issued Sept. 30, 1986, entitled DEVICE FOR EXCHANGING DISKS.) However, drive motors and drive motor supports, add considerable weight to the transport assembly, thus increasing the stresses on the transport assembly drive and on the transport assembly load-bearing components. Moreover, reliability is reduced and maintenance is made more difficult and gentle, smooth movement of the assembly is more difficult.

It has been proposed to use a belt or cable system to eliminate mounting one or more motors on moving components of the transport assembly. Thus, for example, in U.S. Pat. No. 4,507,044, issued Mar. 26, 1985, entitled ROBOT AND CONTROL SYSTEM, and U.S. Pat. No. 4,566,346, issued Jan. 28, 1986, entitled AUTOMATED TOOL MANIPULATING STRUCTURE WITH X-Y MOVEMENT INCLUDING A BELT AND PULLEY DRIVE ARRANGEMENT, there are disclosed arrangements in which x and y direction drive motors are not mounted on the member which is moved in the x and y directions. Although these arrangements may be suitable for the purposes for which they were intended, they do not solve the problem of rough and jerky movement of the driven assembly. Although spring tensioning devices have been proposed for use in belt and chain driven assemblies (See, e.g., U.S. Pat. No. 4,476,508, issued Oct. 9, 1984, entitled APPARATUS FOR RECORDING FLEXIBLE MAGNETIC DISKS; U.S. Pat. No. 4,198,871, issued Apr. 22, 1980, entitled TRANSDUCER POSITIONING APPARATUS; and U.S. Pat. No. 4,637,773, issued Jan. 20, 1981, entitled INDUSTRIAL ROBOT OF THE ARTICULATED ARM TYPE), such devices are not suitable for use in a belt drive system for a magnetic tape cassette transport system. In the latter system, it is desirable to transport a magnetic tape cassette in a manner which prevents damage to the cassette and the tape contained therein.

SUMMARY OF THE INVENTION

According to the present invention, there is provided a belt drive system for a magnetic tape cassette transport assembly which obviates the disadvantages of the prior art. According to an aspect of the present invention, a magnetic tape cassette transport/accessor assembly is actuated by a sprocket driven belt drive system having a spring dampener assembly which minimizes rough and jerky movements and effects gentle and smooth acceleration and deceleration of the assembly. The spring dampener assembly provides compensation for belt stretching, belt drive wear and differential thermal expansion and contraction of the belt.

According to a feature of the present invention, a magnetic tape cassette storage and utilization system, includes a plurality of magnetic tape cassette storage compartments and magnetic tape cassette utilization locations, which are accessed by a cassette transport/accessor assembly. The transport/accessor assembly is automatically moved in horizontal, vertical and lateral directions by a sprocket driven, belt drive system. Each sprocket driven, belt drive of the system includes a stationary motor and a sprocket driven belt coupled to the transport/accessor assembly by means of a spring dampener assembly. Preferably, the spring dampener assembly includes a leaf spring assembly and a coulomb dampener over which the belt is stretched.

DESCRIPTION OF THE DRAWINGS

In the detailed description of the preferred embodiments of the invention presented below, reference is made to the accompanying drawings in which like numbers represent like elements.

FIGS. 3A and 4 are perspective views of components of the apparatus of FIGS. 2A and 2B, while FIG. 3B is a partial, sectional view of a segment of the components shown in FIG. 3A.

DESCRIPTION OF THE PREFERRED EMBODIMENTS

In the following description of a preferred embodiment of the present invention, it will be described as used in a magnetic tape cassette transport/accessor system for magnetic tape cassette storage and record/reproduce apparatus. It will be understood, however, that the present invention may also be used in transport systems for other types of electronic media, such as optical disks. As used in this application, the term "accessor" defines an assembly which grips or holds a magnetic tape cassette, (1) while the assembly is moved into or out of a cassette storage location or a cassette loading location of a record/reproduce device, to insert or extract the cassette at the location; and (2) while the assembly is transported between storage and/or loading locations.

Figure 1:
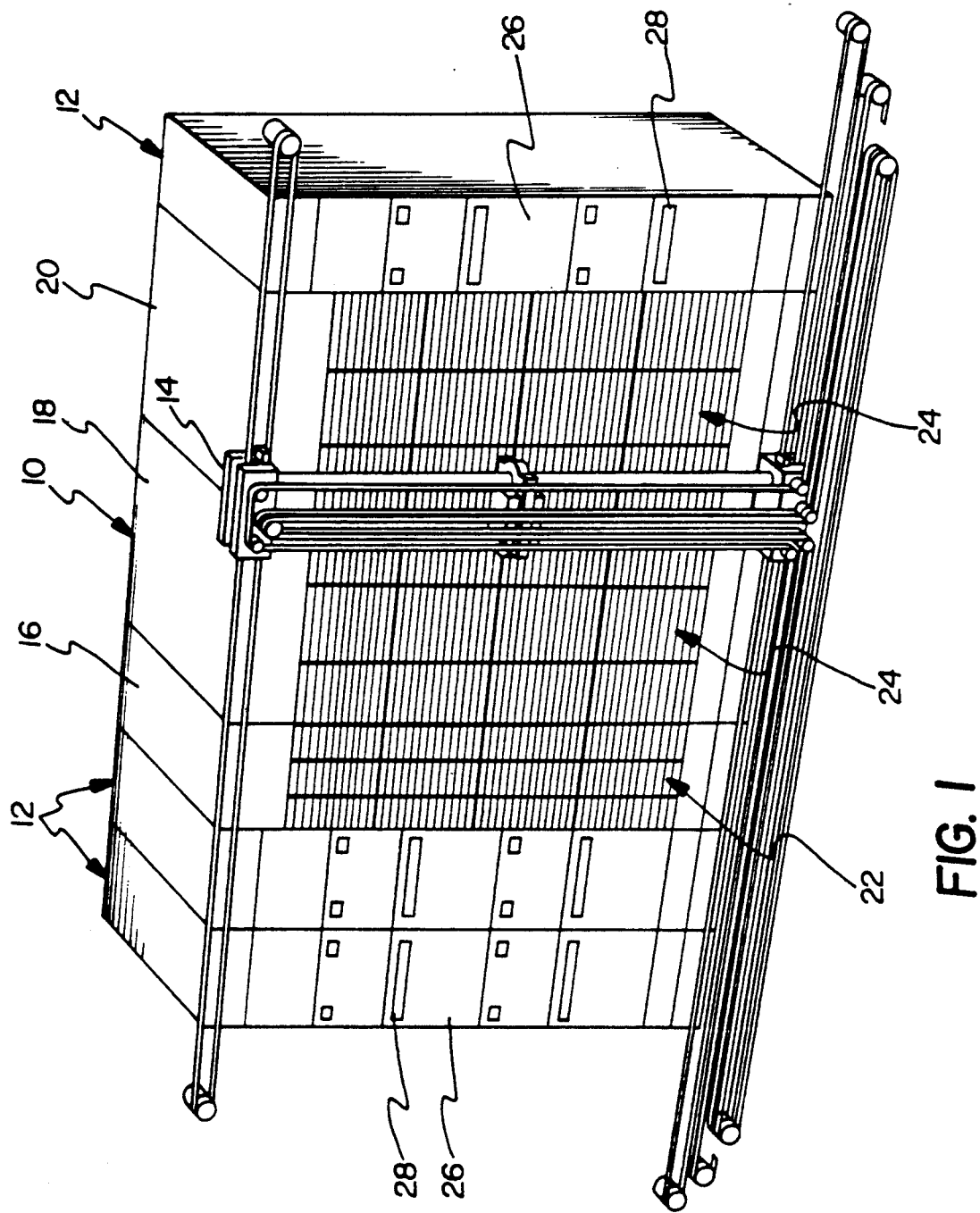
FIG. 1 is a perspective, diagrammatic view of a magnetic tape cassette storage and utilization system incorporating an embodiment of the present invention.

Referring now to FIG. 1, there is shown magnetic tape cassette storage system 10, magnetic tape record/reproduce modules 12 (cassette utilization devices) and magnetic tape cassette transport/accessor assembly 14. Cassette storage system 10 includes side-by-side storage modules 16, 18 and 20. Storage module 16, for example, has a matrix of small cassette storage compartments 22 for storing small magnetic tape cassettes. Storage modules 18 and 20 have a matrix of large cassette storage compartments 24 for storing large magnetic tape cassettes. Each of storage modules 16, 18 and 20 comprise a matrix of columns and rows of cassette storage compartments to store a large number of magnetic tape cassettes of a given size.

Each record/reproduce module 12 includes two magnetic tape record/reproduce devices 26, which include a cassette loading slot 28, through which a magnetic tape cassette is inserted into and extracted from device 26.

Figure 2A:
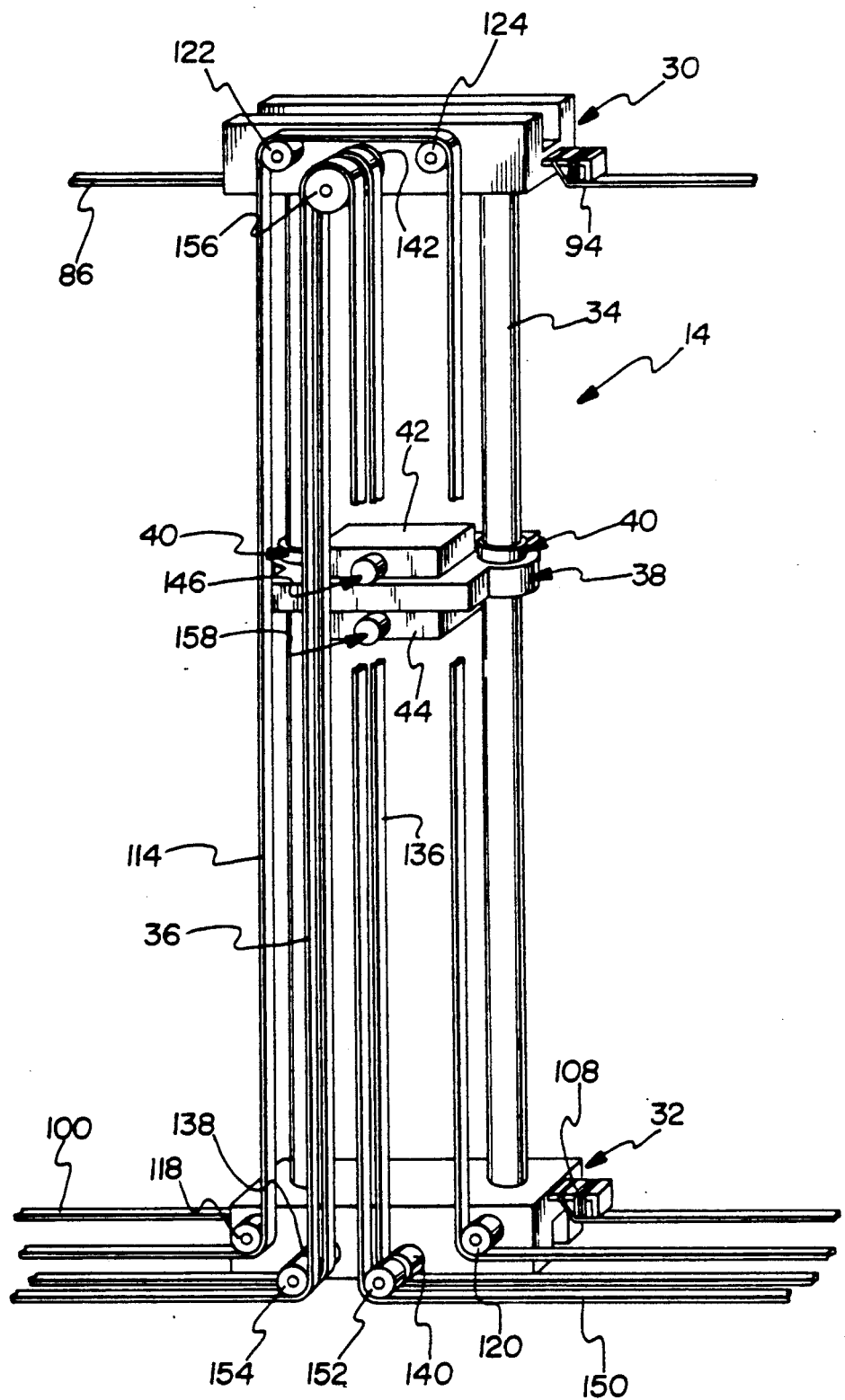
FIGS. 2A and 2B are, respectively, front perspective and diagrammatic views of a cassette transport/accessor assembly including an embodiment of the present invention.

Referring now to FIGS. 2A-4, there will be described in greater detail the cassette transport/accessor assembly 14. As shown in FIG. 2A, cassette transport/accessor assembly 14 includes, upper carriage 30, lower carriage 32, vertical rails 34 and 36, rigidly mounted on carriages 30 and 32, and accessor platform 38, which is mounted for vertical movement on vertical rails 34 and 36 by means of bearings 40. Accessor platform 38 carries two magnetic tape cassette accessors 42 and 44.

As shown in FIG. 3A, upper carriage 30 travels on V-shaped upper rail 46 and lower carriage 32 travels on V-shaped lower rail 48. Rails 46 and 48 are parallel and are respectively located at the top and bottom of modules 12, 16, 18 and 20. Rails 46 and 48 extend the length of modules 12, 16, 18, 20. Carriage 32 includes a housing 50 mounted on wheel-carrying member 52 by means of springs 54 and 56. Member 52 rotatably mounts a plurality of V-shaped wheels 60 by means of brackets 62. As shown in FIG. 3B, rail 48 and wheels 60 have complementary V shapes.

Upper carriage 30 is similar in construction to lower carriage 32. Carriage 30 includes housing 64 mounted on wheel-carrying member 66 by means of springs 68. Member 66 supports a plurality of V-shaped wheels 70 by means of wheel brackets 72.

According to the present invention, a sprocket driven belt drive system, having spring dampener assemblies, drives the cassette transport/accessor assembly 14 in three mutually orthogonal directions, i.e. horizontal, vertical and lateral directions. By eliminating drive motor and drive motor supports on the cassette transport/accessor assembly, the weight of the assembly is kept to a minimum. Such weight reduction minimizes stresses in the transport/accessor assembly drive and in load-bearing components. This minimized stress is directly translatable into improved reliability and maintainability. Moreover, the spring dampener assemblies minimize rough and jerky movements of the assembly and effect gentle and smooth acceleration and deceleration of the assembly. Thus, cassettes are transported without danger of damage to the cassette and the fragile magnetic tape contained therein.

Figure 2B:
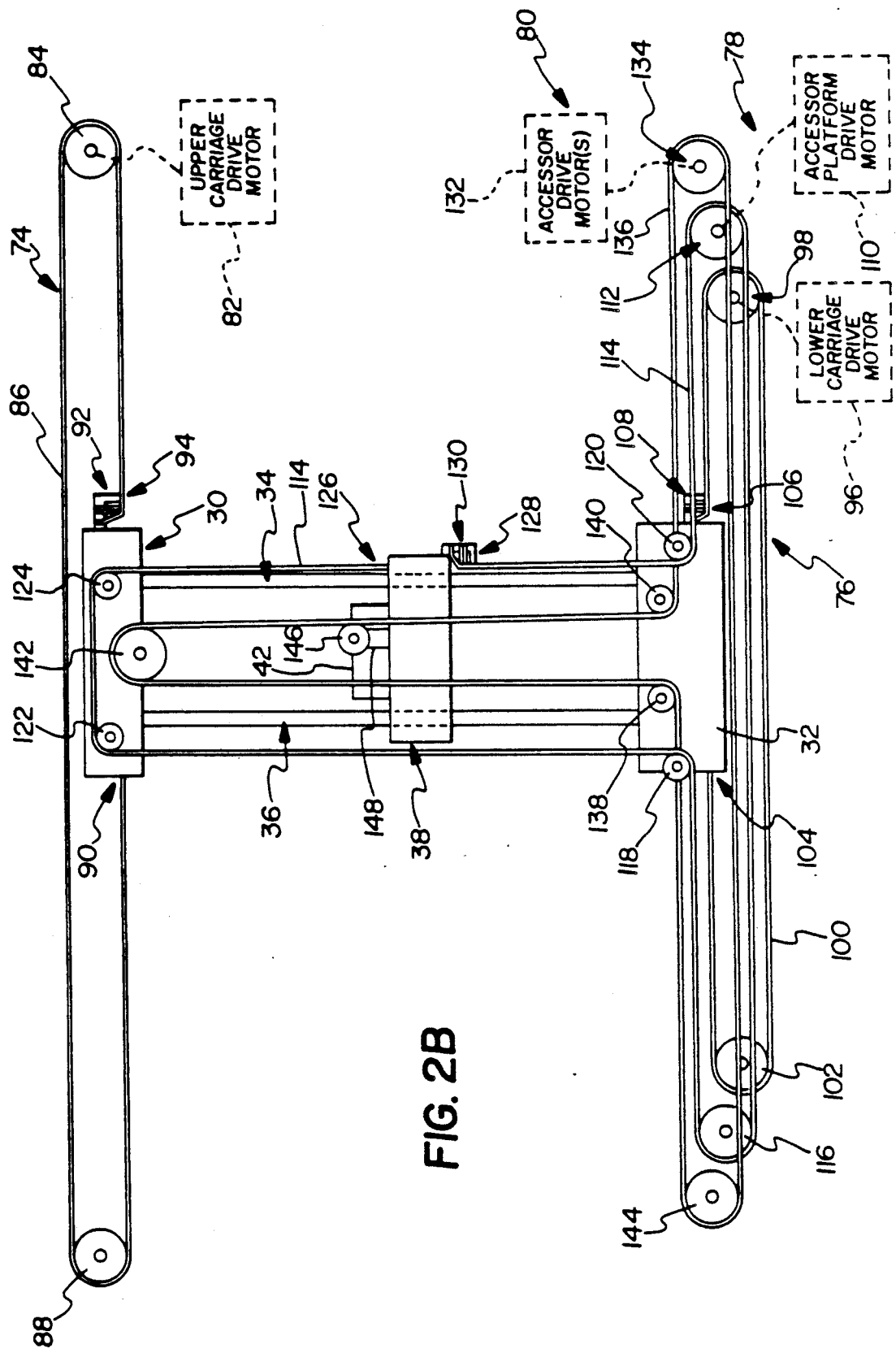

As shown in FIGS. 2A and 2B, there is provided an upper carriage belt drive 74, a lower carriage belt drive 76, accessor platform belt drive 78 and accessor belt drive 80. Upper and lower carriage belt drives 74 and 76 provide horizontal movement to the transport/accessor assembly and cause carriages 30 and 32 to travel along rails 46 and 48, respectively. Drives 74 and 76 are driven synchronously so that the assembly is not subjected to any tilting forces. Accessor platform belt drive 78 drives accessor platform 38 vertically along rails 34 and 36. Accessor belt drive 80 drives the accessor or accessors on accessor platform 38 laterally to insert and extract magnetic tape cassettes from the storage compartments of cassette storage system 10 and from the cassette loading slots of record/reproduce modules 12.

Upper carriage belt drive 74 includes an upper carriage drive motor 82 (FIG. 2B) connected to sprocket 84. Sprocket 84 drives perforated stainless steel belt 86. Belt 86 is trained about sprocket pulley 88 and is fixedly attached at one end 90 to upper carriage 30 and at its other end 92 to carriage 90 by means of spring dampener assembly 94, according to the present invention. Lower carriage belt drive 76 includes lower carriage drive motor 96 connected to sprocket 98. Sprocket 98 drives perforated stainless steel belt 100 which is trained around sprocket pulley 102. Belt 100 is fixedly attached to lower carriage 32 at one end 104 and at the other end 106 by means of spring dampener assembly 108, according to the present invention.

Accessor platform belt drive 78 includes accessor platform drive motor 110 connected to sprocket 112. Sprocket 112 drives perforated, stainless steel belt 114 which is also trained about sprocket pulley 116. Belt 114 is also trained about sprocket pulleys 118 and 120 mounted on lower carriage 32 and about sprocket pulleys 122 and 124 mounted on upper carriage 30. Belt 114 is fixedly attached at one end 126 to accessor platform 38 and at its other end 128 to accessor platform 38 by means of spring dampener assembly 130, according to the present invention.

As shown diagrammatically in FIG. 2B, accessor belt drive 80 includes accessor drive motor 132 which is connected to sprocket 134. Sprocket 134 drives perforated stainless steel belt 136. Belt 136 is trained about sprocket pulleys 138 and 140 rotatably mounted on lower carriage 32, about sprocket pulley 142 rotatably mounted on upper carriage 30 and about sprocket pulley 144. Belt 136 engages a sprocket 146 which is mounted on accessor platform 38 by means of bracket 148.

A second accessor belt drive is provided for driving accessor 44 in a lateral direction. (See: FIG. 2A) The second accessor belt drive includes a perforated stainless steel belt 150 driven by an accessor drive motor (not shown). Belt 150 is trained about sprocket pulleys 152 and 154 rotatably mounted on lower carriage 32 and about sprocket pulley 156 rotatably mounted on upper carriage 30. Belt 150 engages sprocket 158 mounted on accessor platform 38. Belt 150 drives accessor 44 to travel in a lateral direction to insert and extract a magnetic tape cassette. Motors 82, 96, 110 and 132 are preferably brushless direct current motors.

Figure 5:
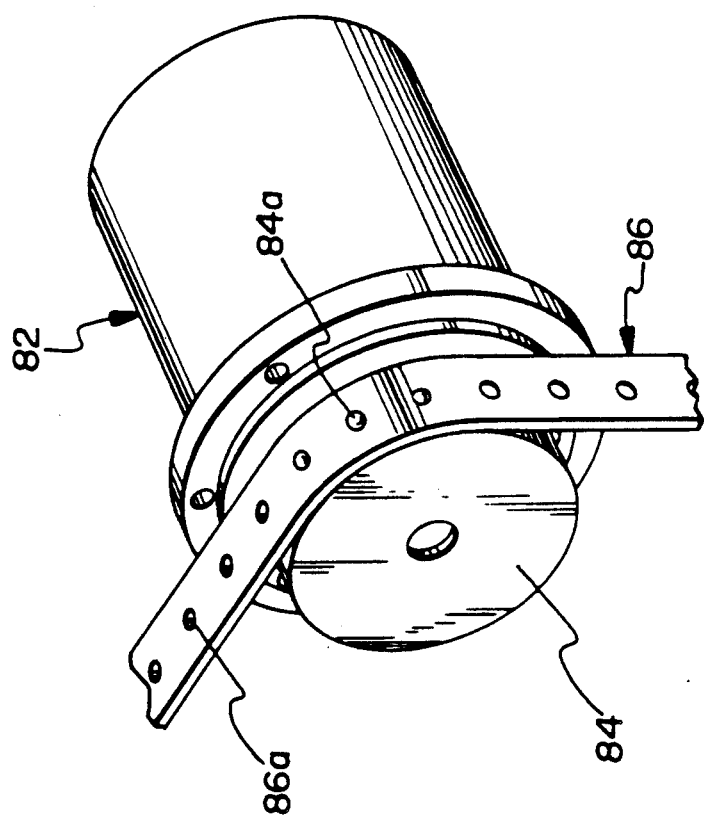
FIG. 5 is a perspective view showing, in detail, a motor-sprocket-belt drive used in the apparatus shown in FIGS. 2A and 2B.

FIG. 5 shows a perspective view of upper carriage drive motor 82 connected to sprocket 84. Belt 86 has perforations (sprocket holes) 86a which are engaged by sprocket teeth 84a of sprocket 84. Drive belts 86, 100, 114, 136 and 150 are high yield, stainless steel belts. The stress in the stainless steel belts to move their respective loads is very low when compared to the strength of the belt material. The belts are installed with low tension in order that the friction force between a drive belt and a sprocket pulley is not sufficient to drive the respective load in acceleration. Thus, the sprocket teeth of the drive sprocket will drive the belt unaided and unopposed by belt friction.

Figure 6A:
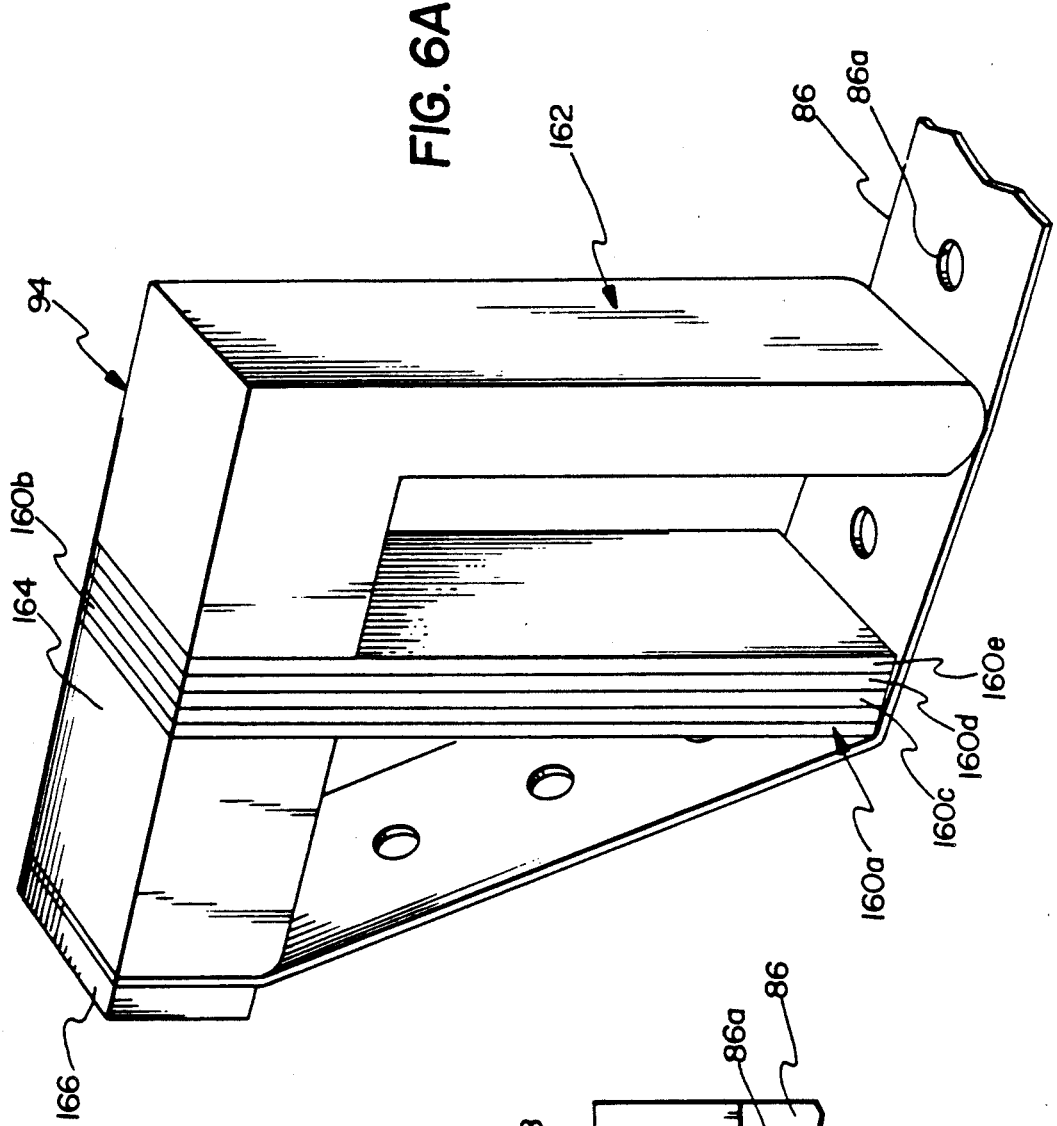
FIGS. 6A, 6B, and 6C are views of an embodiment of spring-dampener assembly according to the present invention.
Figure 6B:
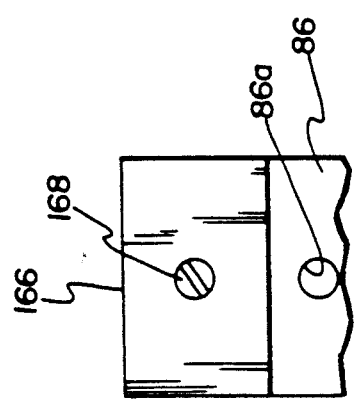
Figure 6C:
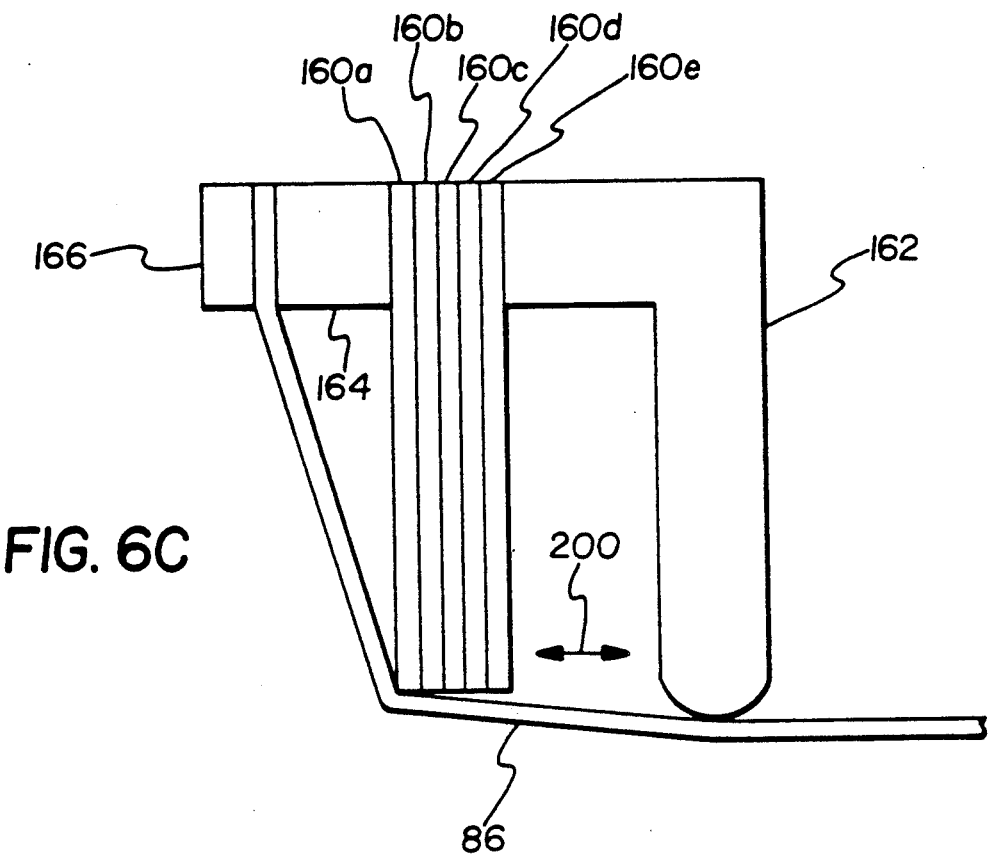

According to the present invention, spring dampener assemblies 94, 106 and 130 minimize rough and jerky movements of the transport/accessor assembly 14 and provide smooth acceleration and deceleration of the respective assemblies driven by the belts to which they are attached. The spring dampener assemblies also provide compensation for differential thermal expansion and contraction of the belt drive and for wear and stretching of the belt. As shown in FIGS. 6A, 6B and 6C, spring dampener assembly 94 comprises a leaf spring assembly 160, including a plurality of stacked leaf springs 160a-160e, and L-shaped dampener 162. Leaf spring assembly 160, L-shaped dampener 162 and member 164 are assembled together by means of suitable means, such as by fasteners (not shown). Belt 86 is secured to member 164 by means of screw 168 (FIG. 6B) which clamps the end of belt 86 between members 164 and 166. Belt 86 is bent around springs 160 and dampener 162. Spring dampener assembly 94 may be secured to upper carriage 30 by any well known means. Spring dampener assemblies 106 and 130 are similar in construction to assembly 94.

As shown in FIG. 6C, belt 86 is held in tension by leaf springs 160a-160e. During actuation of the belt drive, belt 86 will bend in the direction of arrow 200. Dampener 162 is a "coulomb" type dampener and functions to absorb and smooth vibrations of the belt drive system during actuation (i.e., acceleration, deceleration) thereof. The dimensions of each leaf spring 160a-160e, the number of leaf springs used in a spring assembly etc., is a function, among others, of belt tension, force required to accelerate and decelerate the transport-/accessor assembly, etc.

Figure 7:
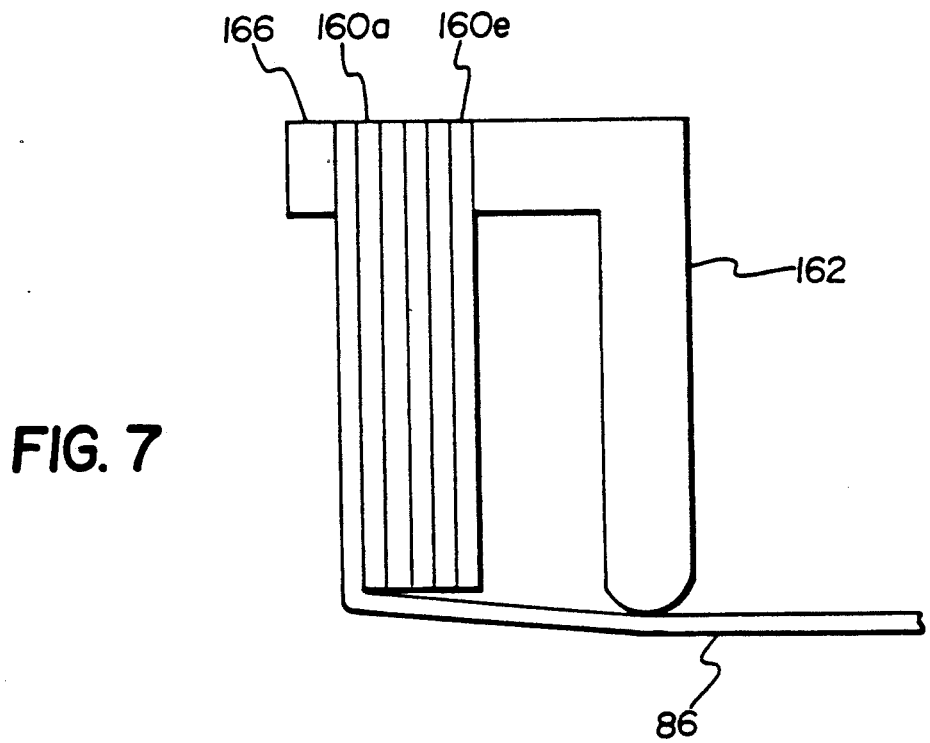
FIG. 7 is an elevational view of another embodiment of the present invention.

Referring to FIG. 7, there is shown a variation of the spring dampener assembly of FIG. 6A-16C in which the end of belt 86 is secured directly to spring assembly 160, member 164 being eliminated.

Figure 4:
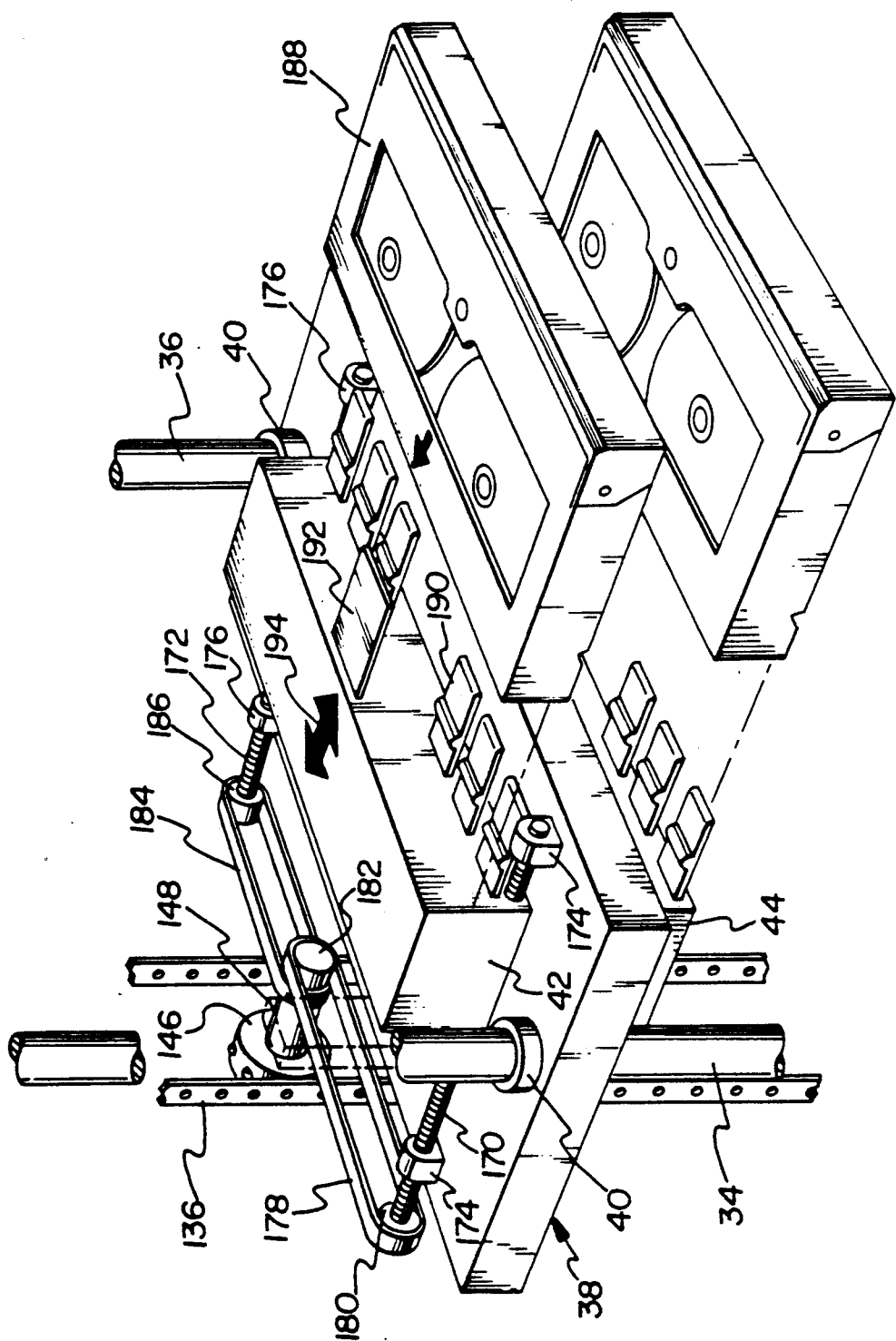

Referring now to FIG. 4, there is shown in greater detail, cassette accessor assemblies 42 and 44. Cassette accessor 42 is mounted for lateral movement on accessor platform 38 by means of lead screws 170 and 172, respectively mounted on platform 38 by means of brackets 174 and 176.

Rotation of sprocket 146 by drive belt 136 rotates screws 170 and 172 by means of belts 178 and 184. Belt 178 is trained about a pulley 180 which is mounted on screw 170, and also about a shaft 182 upon which sprocket 146 is mounted. Belt 184 is trained about a pulley 186 which is mounted on screw 172 and also about shaft 182.

Accessor 44 is driven in a lateral direction by a similar screw assembly (not shown).

A magnetic tape cassette 188 is gripped by lower fingers 190 and upper finger 192. Reference is made to copending U.S. patent application Ser. No. 286,403, entitled ACCESSOR FOR A MAGNETIC TAPE CASSETTE, for a more detailed description of the operation of accessors 42 and 44. In general, an accessor is moved into and out of a storage compartment or a cassette loading slot to insert or extract a magnetic tape cassette. The fingers 190 and 192 are locked and unlocked by the motion of the accessor in a lateral direction (as shown by arrow 194).

The cassette transport/accessor assembly 14 physically transports any size magnetic tape cassette between any cassette storage compartment 22 or 24 in cassette storage system 10, and any other storage compartment in system 10 or a cassette loading slot of any record/reproduce device 26 in modules 12. In actuating the upper and lower carriage drive motors 82 and 96 and accessor platform drive motor 110, the accessor platform may be moved horizontally, vertically, or diagonally to position the accessor platform at any location for inserting or extracting a magnetic tape cassette. After the accessor platform 38 has been properly positioned, accessor drive motor 132 is actuated to move the accessor 42 (or 44) laterally to extract or insert a magnetic tape cassette. By providing two accessors 42 and 44 on accessor platform 38, one accessor may be used to extract a cassette from a record/reproduce device, while the other accessor inserts the next magnetic tape cassette to be used by the record/reproduce device. Thus, cassette exchange is effected in a minimum amount of time. During the time that a magnetic tape cassette is being loaded, threaded and played (or recorded) in a magnetic tape record/reproduce device, the transport/accessor assembly 14 travel to deposit the last used magnetic tape cassette in its storage compartment and to access another magnetic tape cassette to be used by a record/reproduce unit.

The invention has been described above in detail with respect to preferred embodiments thereof, but it will be understood that variations and modifications can be effected within the spirit and scope of the invention.

What is claimed is:

1. A magnetic tape cassette transport apparatus comprising:
    storage means for defining a plurality of locations for storing a magnetic tape cassette;
    a magnetic tape record/reproduce device located contiguous to said storage means;
    means positioned adjacent to said storage means and said record/reproduce device for selectively transporting a magnetic tape cassette in horizontal, vertical and lateral directions between said storage locations or between said storage locations and said record/reproduce device; and
    drive means coupled to said transport means for selectively driving said transport means in said horizontal, vertical and lateral directions, wherein said drive means includes a belt means coupled to said transport means for driving said transport means in one of said horizontal, vertical or lateral directions; wherein said belt means includes a perforated belt, a leaf spring/dampener assembly for coupling said belt to said transport means and stationary actuatable sprocket motor means for driving said belt; wherein said leaf spring/dampener assembly includes means for securing said belt to said transport, a leaf spring over which said belt passes and a dampener spaced from said leaf spring over which said belt passes, so that said dampener dampens vibrations in said belt when said motor means is actuated.

2. The apparatus of claim 1 wherein said leaf spring/dampener assembly includes a plurality of leaf springs over which said belt passes and an L-shaped coulomb dampener over which said belt passes at a location spaced from said leaf springs.

3. A magnetic tape cassette transport apparatus comprising:

storage means for defining a plurality of locations for storing a magnetic tape cassette;

a magnetic tape record/reproduce device located adjacent to said storage means;

magnetic tape gripper means for gripping a magnetic tape cassette;

transport means for transporting said gripper means between said storage locations or between said storage locations and said record/reproduce device in horizontal and vertical directions;

first belt drive means coupled to said transport means for driving said transport means in a horizontal direction, said first belt drive means including a first perforated belt, a first leaf spring/dampener assembly for coupling said first belt to said transport means and first stationary actuatable sprocket motor drive means for driving said first belt; wherein said first leaf spring/dampener assembly includes means for securing said first belt to said transport means, a leaf spring over which said first belt passes and a coulomb dampener spaced from said leaf spring over which said first belt passes, so that said dampener dampens vibrations in said first belt when said drive means is actuated; and second belt drive means coupled to said transport means for driving said transport means in a vertical direction, said second belt drive means including a second perforated belt, a second leaf spring/dampener assembly for coupling said second belt to said transport means and second stationary actuatable sprocket motor drive means for driving said second belt; wherein said second leaf spring/dampener assembly includes means for securing said second belt to said transport means, a second leaf spring over which said second belt passes and a second coulomb dampener spaced from said second leaf spring over which said second belt passes, so that said second dampener dampens vibrations in said second belt when said second drive means is actuated.

4. The apparatus of claim 3 wherein said transport means includes: (a) spaced, parallel upper and lower rails located adjacent to said storage means; (b) upper and lower carriages respectively mounted on said upper and lower rails, respectively, for travel in said horizontal direction; and wherein said first belt drive means includes upper and lower perforated belts, wherein said first leaf spring/dampener assembly includes upper and lower leaf spring/dampeners for coupling said upper and lower belts, respectively, to said upper and lower carriages and wherein said first motor drive means drives said upper and lower belts in synchronism.

5. The apparatus of claim 4 wherein said first motor drive means includes an upper stationary motor for driving said upper belt and a lower stationary motor for driving said lower belt.

6. The apparatus of claim 4 wherein said transport means further includes vertical rail means connected between said upper and lower carriages and a platform mounted on said vertical rail means for travel in said vertical direction; and wherein said second belt of second belt drive means is coupled to said platform by means of said second leaf spring/dampener assembly.

* * * * *